(12) United States Patent
Maldanis et al.

(10) Patent No.: US 7,858,134 B2
(45) Date of Patent: Dec. 28, 2010

(54) TANKLESS PULSE BREWER

(76) Inventors: Algert J. Maldanis, 2328 Serenity La., Heath, TX (US) 75023; Dick Thorn, 2328 Serenity La., Heath, TX (US) 75023; Barbara Thorn, 2328 Serenity La., Heath, TX (US) 75023

( * ) Notice: Subject to any disclaimer, the term of this patent is extended or adjusted under 35 U.S.C. 154(b) by 826 days.

(21) Appl. No.: 11/736,739

(22) Filed: Apr. 18, 2007

(65) Prior Publication Data

US 2008/0148953 A1 Jun. 26, 2008

Related U.S. Application Data

(60) Provisional application No. 60/871,649, filed on Dec. 22, 2006.

(51) Int. Cl.
*A47J 31/44* (2006.01)
(52) U.S. Cl. .................. 426/433; 426/434; 426/435
(58) Field of Classification Search ............... 426/433, 426/434, 435
See application file for complete search history.

(56) References Cited

U.S. PATENT DOCUMENTS

| 4,703,686 | A | * | 11/1987 | Siegfried | 99/279 |
| 5,072,660 | A | * | 12/1991 | Helbling | 99/280 |
| 2005/0279216 | A1 | * | 12/2005 | Miller | 99/279 |
| 2006/0005712 | A1 | * | 1/2006 | Greenwald et al. | 99/275 |

* cited by examiner

*Primary Examiner*—Anthony Weier
(74) *Attorney, Agent, or Firm*—Law Office of J. D. Pemberton

(57) ABSTRACT

A system that allows for hot water on demand and once the water is heated, it is delivered to flavor containing solid material in a pressurized pulse. By heating the water on demand, a more uniform temperature can be achieved and by delivering the heated water in a pressurized pulse, the extraction of flavor from the flavor containing solid material is greatly improved. In addition, to determine the volume of water used in the system, the number of pressurized pulses are counted and that gives a more uniform consistent measurement of the volume of water used instead of the timed delivery of water.

13 Claims, 5 Drawing Sheets

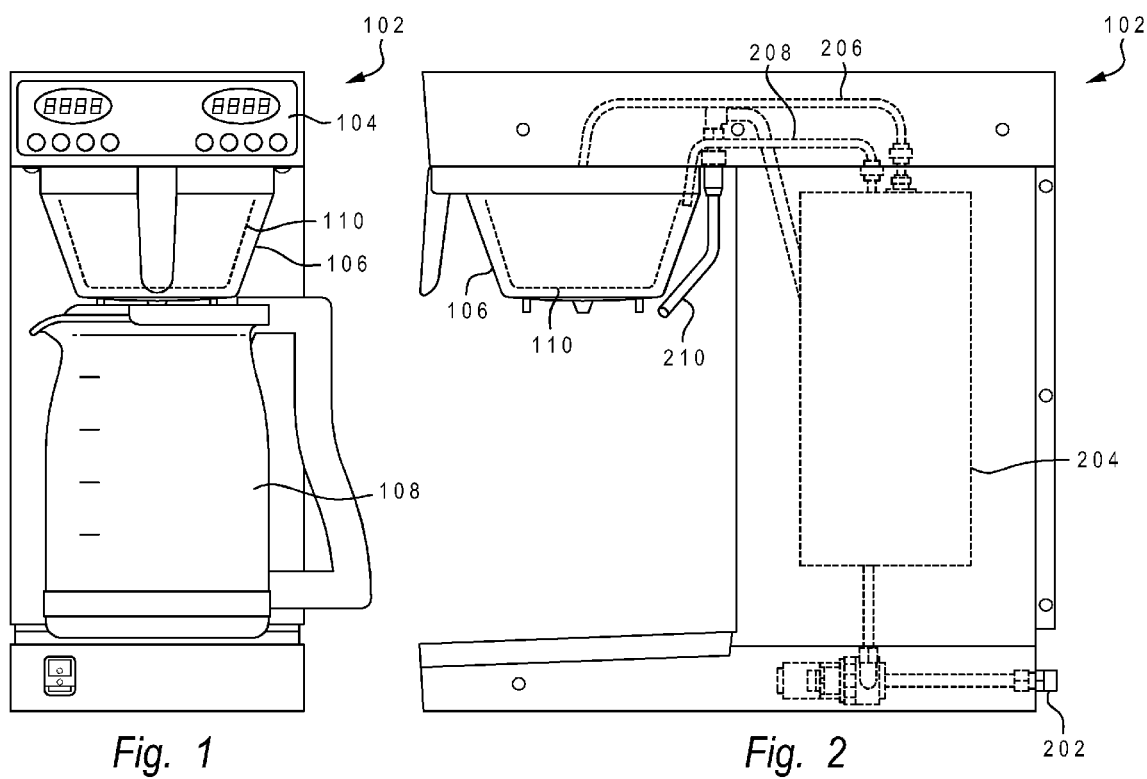

US 7,858,134 B2

TANKLESS PULSE BREWER

CLAIM OF PRIORITY

This application claims the benefit of U.S. Provisional Application No. 60/871,649 filed Dec. 22, 2006 which is incorporated herein by reference.

BACKGROUND OF THE INVENTION

1. Technical Field

This invention relates to brewers, and more particularly, to commercial brewers for flavor containing solid materials.

2. Description of Related Art

It has been known for centuries to prepare coffee, tea, herb extracts and other flavor-containing liquids by steeping the corresponding flavor containing solid materials in hot water under ambient or elevated pressure. The steeping of roasted and ground coffee under ambient pressure emerged in the late 14th century and throughout the 19th and even the early 20th centuries, it was considered adequate to add ground coffee to hot water in a saucepan, boil the mixture until it smelled right, and pour the brew into a cup. It was not until later in the 20th century, that coffee making became somewhat automated.

The modern coffeemaker is a kitchen appliance used to brew coffee without having to boil water in a separate container. While there are many different types of coffeemakers using a number of different brewing principles, in the most common devices, coffee grounds are placed in a paper or metal filter inside a funnel. The funnel is then set over a glass or ceramic coffee pot. Cold water is poured into a separate chamber, and the water is heated up to the boiling point and directed into the funnel. This is commonly called an automatic drip-brew or drip brew coffee maker and is the most popular method used to brew coffee or tea.

Extraction time, water volume and water temperature are among the most critical considerations when brewing coffee with a drip brew coffee maker and in order to achieve a consistent tasting coffee, all three must be kept relatively constant. Typical hot water tank type brewers maintain the temperature of the water in the tank at a preset level through the use of a thermostat.

When a brewing cycle is selected in a typical tank type brewer, water solenoids are opened or closed by an electronic or electromechanical timer. The solenoids control the flow of water from a tank to a basket that contains the solid flavor material to be brewed. To replace the hot water sent to the brewing basket from the tank, cold water from a water source flows into the tank as the hot water is sent to the basket. This water inflow causes the tank temperature to drop during the brew cycle, effecting the extraction of the product from the flavor containing solid material. Various control systems, including solid-state controls, have been used to improve the operation of tank brewers and improve extraction of product. However, the effectiveness of these control systems is arguable, as they have a problem with consistent control, are typically not efficient, and do not keep the temperature and volume of water used relatively constant from brew cycle to brew cycle.

What is needed is a brewer that can heat the water quickly and uniformly and then deliver the water to the material to be brewed in a manner that will enhance the brewing. In addition, the brewer should not use a time based method to measure the amount of water used. It would be beneficial if a more accurate system was used determine the water volume for each brewing cycle.

SUMMARY OF INVENTION

The present invention solves the above-described problem by providing a system that allows for hot water on demand and delivers the heated water to flavor containing solid material in a pressurized pulse. By heating the water on demand, a more uniform temperature can be achieved and by delivering the heated water in a pressurized pulse, the extraction of flavor from the flavor containing solid material is greatly improved. In addition, to determine the volume of water used in the system, the number of pressurized pulses are counted. This results in a more uniform consistent measurement of the volume of water used instead of the timed delivery of water used in the prior art.

During use, the present invention is activated via a control panel. Before activation, water in the system is not being heated and is not flowing through the system. Upon activation, water enters the system through a water inlet and a heater heats the water to a desired temperature. Next, the heated water is delivered in pressurized pulses into a basket that contains flavor contains solid material. The pressurized pulsating water flow into the basket provides better water to ingredient surface contact and agitation for improved extraction of the brewed product.

Because the water is heated using a tankless system, the water can be heated to a more uniform temperature. This not only creates a more uniform brewing temperature but also helps prevent deposits in the tank. In the tank based systems, as water evaporates from the tank, a fill control adds cold supply water to keep it filled at a specific volume. This allows a virtually small steady stream of water that typically contains dissolved minerals. At each down cycle of the thermostat, the minerals in the water precipitate and slowly form a buildup on the walls and floor of the water tank as well as the heating coils. This affects the water volume in the tank and the energy needed to keep the water in the tank at the preset temperature. In the present invention, the precipitation of minerals is reduced to virtually zero because only a relatively small amount of relatively cool room temperature water is held in the heating block held at until needed,.

Other features and advantages of the present invention will become apparent upon reading the following detailed description of embodiments of the invention, when taken in conjunction with the appended claims.

BRIEF DESCRIPTION OF THE DRAWINGS

FIG. 1 is a front view of the brewer in accordance with an embodiment of the present invention.

FIG. 2 is a side view of the brewer in accordance with an embodiment of the present invention.

DETAILED DESCRIPTION OF THE INVENTION

Figure 3:
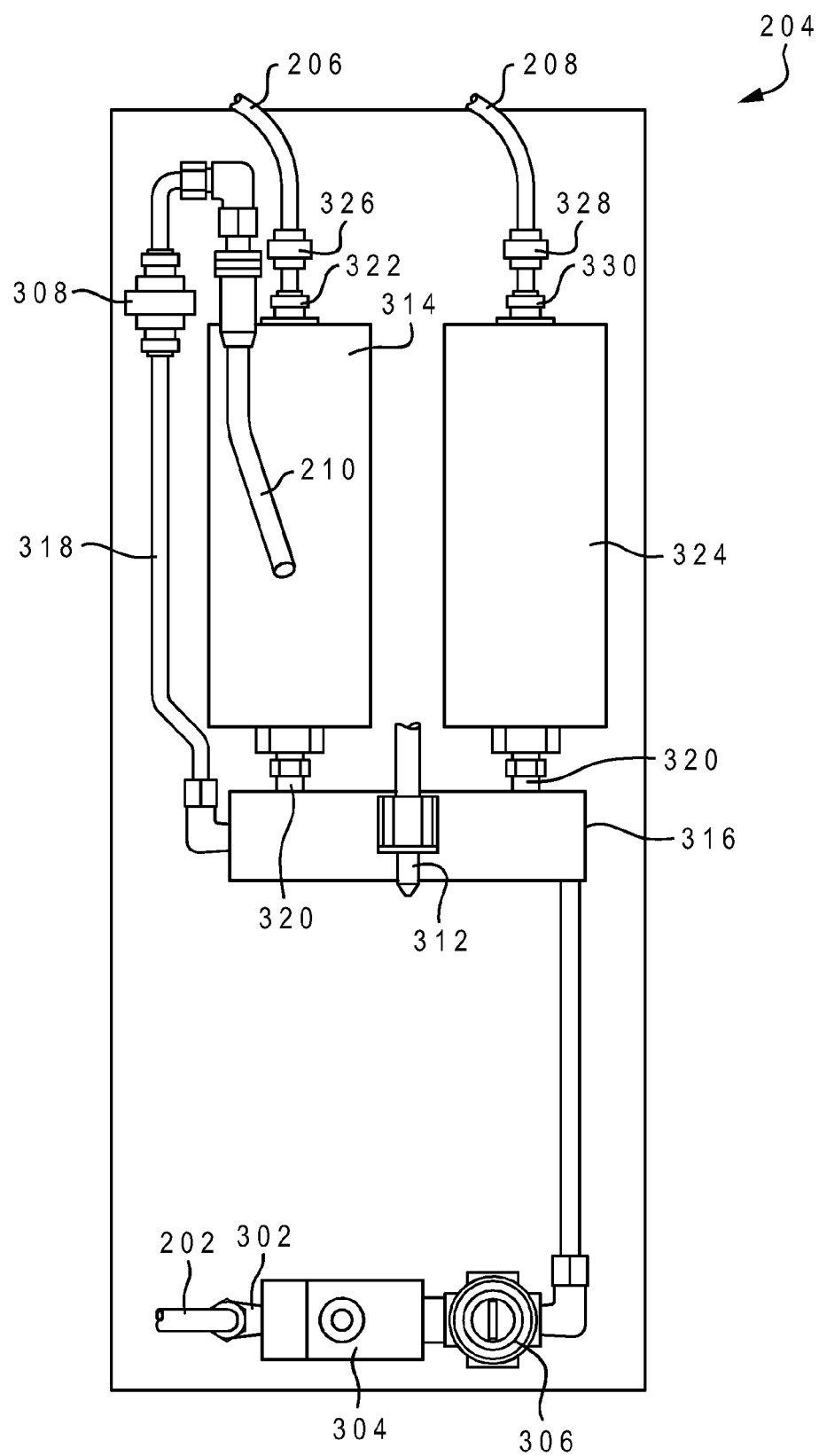
FIG. 3 is a block diagram of the heater in accordance with an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Referring to FIG. 1, shown is tankless pulse brewer 102 containing control panel 104, brew basket 106, filter 110 and carafe 108. Control panel 104 allows the user to control the operation of tankless pulse brewer 102 and is used to start an automated pre-determined brew cycle for brewing flavor containing solid material such as coffee or tea or a delayed start "autobrew" where the brewing starts at a pre-determined clock time. In addition, control panel 104 can create a brew cycle or adjust a predetermined cycle. For example, the adjustment to a predetermined cycle may be an adjustment to the volume of water used where the adjustment is made to the pulse count and/or percentage of by pass water used during a brewing cycle. (The use of a pulse count and by pass water will be described in more detail below.) Brew basket 106 contains the flavor containing solid material that is to be brewed and such material may be any flavor containing solid material that may be brewed such as coffee or tea. Carafe 108 captures and stores the brewed flavor containing liquid.

FIG. 2 is a side view showing water inlet 202, water system 204, basket water line 206, by-pass water line 208, and cold by-pass water line 210. During use, tankless pulse brewer 102 is activated via control panel 104. Upon activation, water enters through water inlet 202 and water system 204 either heats the water and delivers the heated water to brew basket 106 or does not heat the water and delivers the relatively cool water to carafe 108. If the water is heated and delivered to brew basket 106, the heated water may be delivered via basket water line 206 in pressurized pulses directly onto the flavor containing material contained in filter 110. Alternatively, the heated water may be delivered to brew basket 106 away from the flavor containing material on the outside of filter 110 via by-pass water line 208. The pressurized pulsating water flow emanating from basket water line 206 onto the flavor containing material contained in filter 110 provides better water to ingredient surface contact and agitation resulting in an improved extraction of the brewed product. The use of by-pass water line 208 allows for more hot liquid to be delivered to carafe 108 without excessive brewing of the flavor containing material.

FIG. 3 shows a detailed view of water system 204. Water system 204 contains water supply inlet 302, water supply cut off solenoid 304, pressure regulator 306, cold water by-pass solenoid 308, water supply pressure switch 312, main heating block 314, by-pass heater block 324, manifold 316, cold water supply 318, heater inlet 320, main heating block outlet 322, by-pass heating block outlet 330, main heating block pulse counter 326, and by-pass heating block pulse counter 328. Main heating block 314 is connected to basket water line 206. By-pass heating block 324 is connected to by-pass water line 208.

Water supply inlet 302 is connected to water inlet 202. Water supply cut off solenoid 304 regulates the flow of water into water system 204 and can be used to shut off the flow completely, allow water to freely flow into water system 204, or in one embodiment, regulate the flow depending on the user's preferences. The flow may be regulated by the user via control panel 104 or may be regulated as part of an automated process.

Pressure regulator 306 regulates the pressure of the water entering water system 204 and in one embodiment the pressure is between about 30 psi and about 40 psi. Pressure switch 312 is used to monitor the water pressure to ensure the pressure is sufficient for brewing and there is not a leak within the tankless pulse brewer 102. If pressure regulator 306 does detect a problem with the water pressure, pressure regulator 306 can activate water supply cut off solenoid 304 to shut off the flow of water into the system until the problem is resolved.

After the water has passed pressure regulator 306, it is delivered to manifold 316. Manifold 316 is operationally connected to main heating block 314, by-pass heating block 324, and cold water by-pass solenoid 308. Main heating block 314 heats the water to a predetermined temperature and the heated water is delivered to the flavor containing material in brew basket 106 via basket water line 206. By-pass heating block 324 heats the water to a predetermined temperature and the heated water is delivered to brew basket 106 via by-pass water line 208. As stated above, by-pass water line 208 delivers the heated water outside filter 110 and away from the flavor containing material. The predetermined temperature is dependent on the temperature of the water needed to brew the flavor containing material or the desired temperature of the brewed liquid delivered to the carafe.

Cold water by-pass solenoid 208 does not heat the water and the unheated water is delivered to carafe 108 via cold by-pass water line 210. In one embodiment, cold water by-pass solenoid 308 delivers unheated water directly to basket 106.

Figure 4:
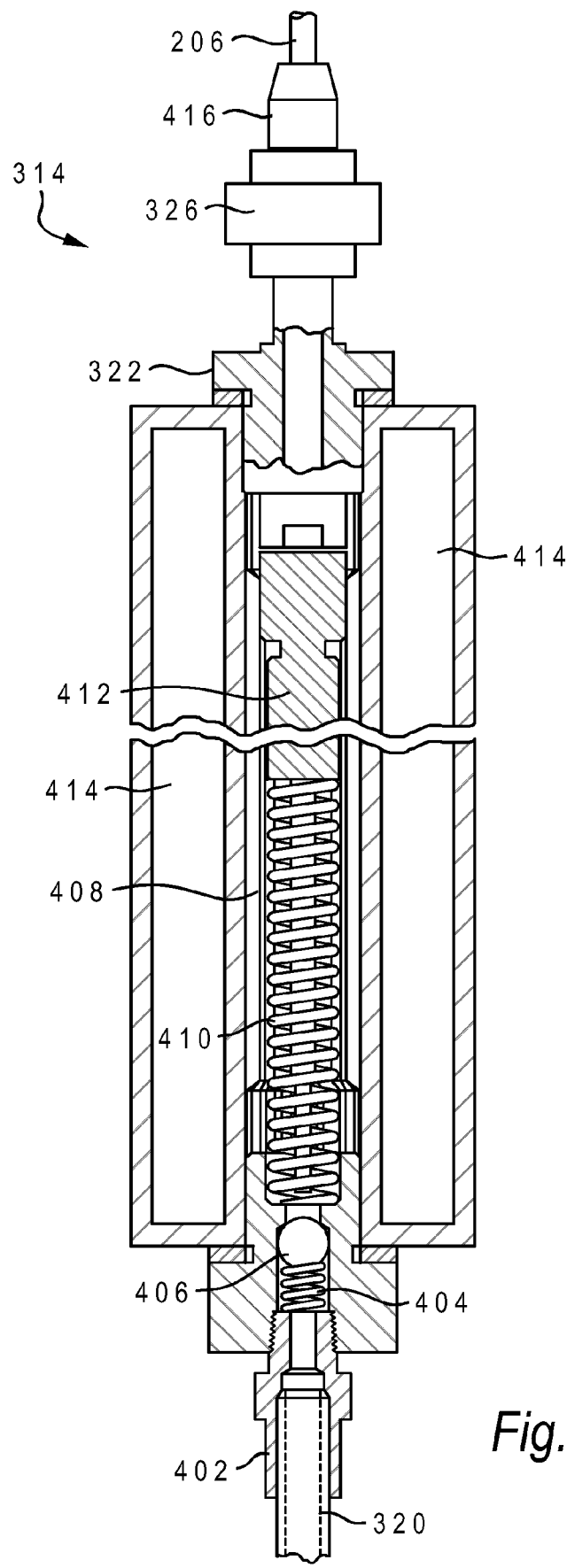
FIG. 4 is a block diagram of the main heating block in accordance with an embodiment of the present invention.

Main heating block 314 and by-pass heating block 324 are identical in construction and may be used interchangeable in the description that follows. Main heating block 314 is show in more detail in FIG. 4. Main heating block 314 contains inlet 402, check valve spring 404, check valve ball 406, water chamber 408, thermal actuator spring 410, thermal actuator 412, at least one cartridge heater 414, and outlet 416. Check valve spring 404 and check valve ball 406 create a check valve and temporally prevent water flow from the inlet 402 into water camber 408. In one embodiment, shown in FIG. 4, main heating block 314 contains two parallel chambers with each chamber housing cartridge heater 414.

Inlet 402 accepts water sent from regulator 306. Check valve spring 404 holds check valve ball 406 against water chamber 408 and does not allow water to enter water chamber 408 until the water inside water chamber 408 reaches a pre-determine temperature. The predetermined temperature is the desired temperature of the brewed liquid delivered to the carafe and/or is the temperature needed to brew the flavor containing material. The predetermined temperature is typically between about 197 degrees to about 205 degrees Fahrenheit.

The water inside water chamber 408 is heated by cartridge heater 414 and when the temperature of the water inside water chamber 408 reaches the desired brewing temperature, thermal actuator 412 expands forcing check valve ball 406 away from water chamber 408 thus allowing the pressurized unheated water from inlet 402 to enter water chamber 408. The pressurized water entering water chamber 408 from inlet 402 forces the heated water in water chamber 408 to exit through outlet 416. When thermal actuator 412 is cooled by the cool incoming water, it retracts allowing the check valve ball 406 to reseat closing off the water flow. This open/close cycle produces a "pressurized pulse" wherein the pressure comes from the regulated water supply. The pressurized pulse is counted by main heating block pulse counter 326 and a signal is sent to control panel 104 where, as described below, the system determines if the brew cycle has completed.

Once the relatively cool pressurized water has entered water chamber 408, thermal actuator 412 is cooled and contracts and check valve ball 406 is forced against water chamber 408 by check valve spring 404. The cold water inside water chamber 408 is heated by cartridge heater 414 until thermal actuator 412 expands forcing check valve ball 406 away from water chamber 408 and the process is repeated until the brewing cycle is completed. Once the brewing cycle is completed, cartridge heater 414 is shut off, the water inside water chamber 408 is no longer heated, and thermal actuator 412 will not expand and force check valve ball 406 away from water chamber 408. Because check valve ball 406 is held against water chamber 408, water does not flow through the system and is held at room temperature until needed. Because the water is not heated until needed, the system creates a more efficient method for heating the water and reduces the precipitation of minerals to virtually zero.

Figure 5:
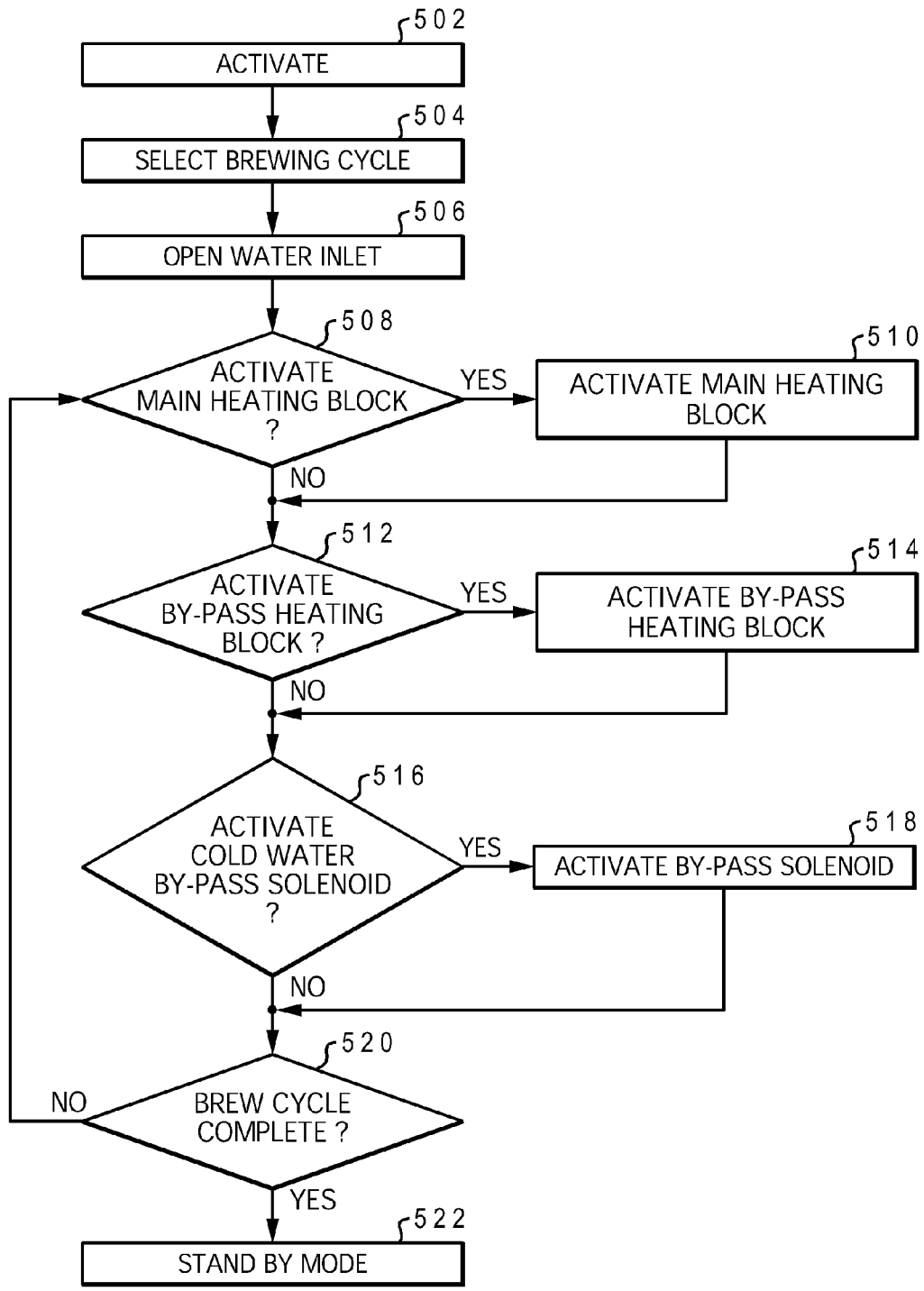
FIG. 5 is a flow diagram depicting the steps used in accordance with an embodiment of the present invention.

By way of example and not of limitation, FIG. 5, shows the steps used during operation of the system. First the system is activated, Step 502. Next, the brewing cycle is selected from control panel 104, Step 504. Then, the system opens water inlet 202, Step 506 and the system determines if main heating block 314 should be activated, Step 508. If the system determines main heating block 314 should not be activated, then the system determines if by-pass heating block 324 should be activated, Step 512. If the system determines main heating block 314 should be activated, then the system activates cartridge main heating block 314, Step 510 and continues to Step 512 where the system determines if by-pass heating block 324 should be activated, Step 512.

If the system determines by-pass heating block 324 should not be activated, then the system determines if cold water by-pass solenoid 208 should be activated, Step 516. If the system determines by-pass heating block 324 should be activated, then the system activates by-pass heating block 324, Step 514 and continues to Step 516 where the system determines if cold water by-pass solenoid 208 should be activated, Step 516.

If the system determines cold water by-pass solenoid 208 should be activated, then the system activates cold water by-pass solenoid 208, Step 518 and continues to Step 520 where the system determines if the brewing cycle has completed, Step 520. If the system determines by-pass heating block 324 should not be activated, then the system determines if the brewing cycle has completed, Step 520. If the system determines the brewing cycle has completed, then the system enters into standby mode, Step 522. If the system determines that the brewing cycle has not completed, then the system goes back to Step 508 and the process continues piecewise until the brewing cycle is completed.

Figure 6:
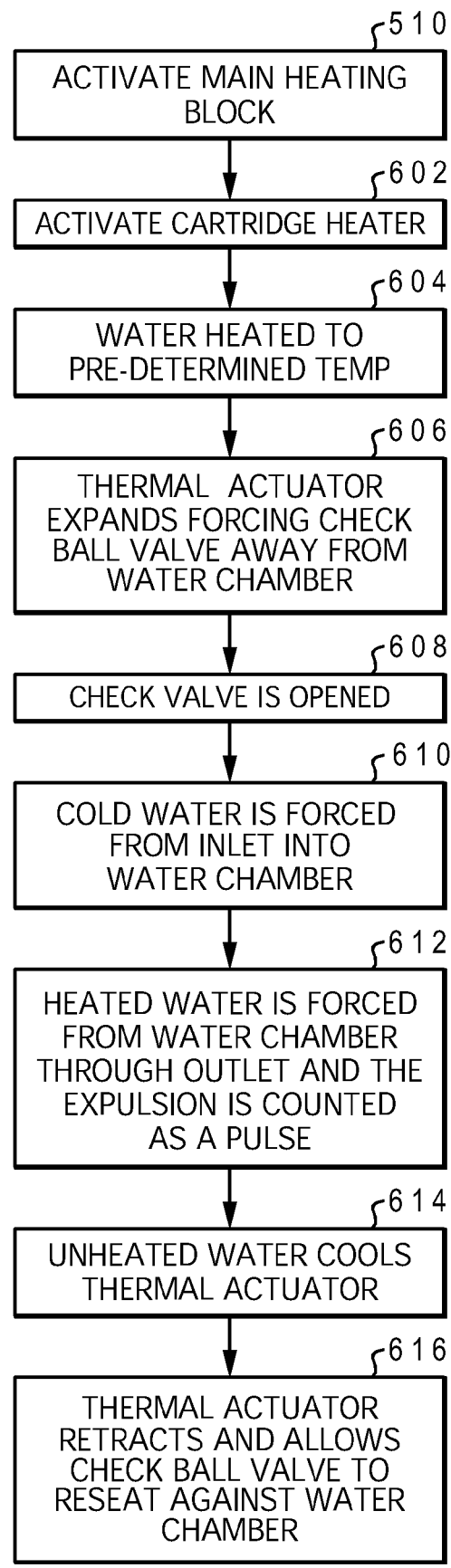
FIG. 6 is a flow diagram depicting the steps used in accordance with an embodiment of the present invention.

As shown in FIG. 6, to active main heating block 314, the system activates cartridge heater 414 in main heating block 314, Step 602. Then the water in main heating block 314 is heated to the predetermined temperature, Step 604. Then, thermal actuator 412 expands forcing check valve ball 406 away from water chamber 408, Step 606 and the valve created by check valve ball 406 seated on water chamber 408, or check valve, is opened, Step 608. As check valve ball 406 is forced away from water chamber 408, the check valve is opened, and pressurized unheated water from inlet 402 is forced into water chamber 408, Step 610. The pressurized water entering water chamber 408 from inlet 402 forces the heated water to exit through outlet 416 and the expulsion or pulse is counted by pulse counter 326, Step 612.

When the unheated water from inlet 402 enters water chamber 408, thermal actuator 412 is cooled, Step 614 and retracts allowing check valve ball 406 to reseat against water chamber 408 closing off the water flow, Step 616. If main heating block 314 was used to heat the water, the hot water expelled or pulsed from water chamber 408 in Step 612 flows through basket water line 206 to the spray head above brewing chamber 106 and onto the flavor containing material. If by-pass heating block 324 was used to heat the water, the hot water expelled or pulsed from water chamber 408 in Step 612 and flows through cold by-pass water line 210 into brewing chamber 106 but away from the flavor containing material in brewing chamber 106. It should be noted that the above process described for the activation of main heating block 314 can also be used to describe the activation of by-pass hearing block 324.

When a brew cycle is selected from control panel 104, control panel 104 determines the number of pulses from main heating block 314 and from by-pass heating block 324 required for the selected brew cycle. Control panel 104 also determines when main heating block 314 and by-pass heating block 324 should be activated during the brew cycle. In addition, control panel 104 calculates the volume of water necessary to flow through cold water by-pass solenoid 208 for the selected brew cycle and when by-pass solenoid 208 should be activated during the brew cycle. Control panel 104 then cycles through the above process and activates main heating block 314, by-pass heating block 324, and/or cold water by-pass solenoid 208 at the appropriate time.

By way of example and not of limitation, to brew less than one gallon of coffee, the brew cycle may only require the activation of main heating block 314 whereas to brew more than one gallon of coffee, the brew cycle may require the activation of main heating block 314 and by-pass heating block 324 so an proper amount of hot liquid can be produced without over brewing the flavor containing material.

To brew tea for use in iced tea, after the first pulse from main heating block 314, by-pass solenoid 208 is activated allowing relatively cold or room temperature water to be added directly into carafe 108 via cold by-pass water line 210. By adding the relatively cool or room temperature water directly into the carafe 108, the relatively hot flavor containing liquid from brew basket 106 is cooled down to prepare the flavor containing liquid to be served with ice.

It should be understood that the foregoing relates to exemplary embodiments of the invention and that modifications may be made without departing from the spirit and scope of the invention as set forth in the following claims.

What is claimed is:

1. A method of using a tankless pulse brewer, the method comprising:
   selecting a brew cycle from a control panel;
   opening a water inlet;
   1. conditioned upon the system determining if a main heating block should be activated, activating the main heating block to heat water that will be used during the brew cycle and delivered to flavor containing solid material;
   2. conditioned upon the system determining if a by-pass heating block should be activated, activating the by-pass heating block to heat water that will be used during the brew cycle and delivered to the flavor containing solid material;
   3. conditioned upon the system determining if a cold water by-pass solenoid should be activated, activating the cold water by-pass solenoid to deliver non-heated water to the flavor containing solid material; and conditioned upon the system determining the brewing cycle has not completed, repeating steps 1,2, and 3 above.

2. The method of claim 1, wherein, the step of activating main heating block includes activating a cartridge heater in the main heating block;
    heating water in a water chamber to a predetermined temperature wherein the water chamber is located inside the main heating block;
    conditioned upon the water in the main heating block reaching a predetermined temperature, allowing a thermal actuator to expand thereby forcing a check valve ball away from the water chamber such that pressurized unheated water from an inlet is forced into the water chamber and the pressurized water entering water chamber forces the heated water to exit through an outlet;
    counting the expulsion or pulse by a pulse counter; and
    allowing the thermal actuator to cool and retract such that the check valve ball reseats against water chamber closing off the water flow from the inlet.

3. The method of claim 2, wherein the pulsed heated water from main heating block flows through a basket water line to a spray head and onto flavor containing material that is to be brewed.

4. The method of claim 1, wherein the step of activating by-pass heating block includes activating a cartridge heater in the by-pass heating block;
    heating water in a water chamber to a predetermined temperature wherein the water chamber is located inside by-pass heating block;
    conditioned upon the water in the by-pass heating block reaching a predetermined temperature, allowing a thermal actuator to expand thereby forcing a check valve ball away from water chamber such that pressurized unheated water from an inlet is forced into the water chamber and the pressurized water entering water chamber forces the heated water to exit through an outlet;
    counting the expulsion or pulse by a pulse counter;
        allowing the thermal actuator to cool and retract such that the check valve ball reseats against water chamber closing off the water flow from the inlet.

5. The method of claim 4, wherein the pulsed heated water from by-pass heating block flows through by-pass water line and into a brewing chamber but away from the flavor containing material in brewing chamber.

6. The method of claim 1, wherein the control panel determines the number of pulses from the main heating block and from the by-pass heating block required for the selected brew cycle and when the main heating block and the by-pass heating block should be activated during the brew cycle.

7. The method of claim 1, wherein the water is heated between about 197 degrees and about 205 degrees Fahrenheit.

8. The method of claim 1, wherein the main heating block contains an inlet;
    a check valve to prevent water flow from the inlet into water chamber wherein the check valve includes a
        check valve spring;
        check valve ball;
    a water chamber;
    a thermal actuator spring;
    a thermal actuator; and
    at least one cartridge heater.

9. The method of claim 8, wherein the main heating block contains two parallel cartridge heating chambers.

10. A method of using a tankless pulse brewer that allows for hot water on demand and delivers the heated water to flavor containing solid material in a pressurized pulse, the tankless pulse brewer comprising the steps of:
    selecting a brew cycle from a control panel opening a water inlet
    1. conditioned upon the system determining if main heating block should be activated, activating main heating block wherein the step of activating main heating block includes activating a cartridge heater in main heating block;
    heating water in a water chamber to a predetermined temperature wherein the water chamber is located inside main heating block;
    conditioned upon the water in main heating block reaching a predetermined temperature, allowing a thermal actuator to expand thereby forcing a check valve ball away from the water chamber such that pressurized unheated water from an inlet is forced into the water chamber and the pressurized water entering water chamber forces the heated water to exit through an outlet;
    counting the expulsion or pulse by a pulse counter;
    allowing the thermal actuator to cool and retract such that the check valve ball reseats against water chamber closing off the water flow from the inlet;
    2. conditioned upon the system determining if by-pass heating block should be activated, activating by-pass heating block wherein the step of activating by-pass heating block includes
    activating a cartridge heater in by-pass heating block;
    heating water in a water chamber to a predetermined temperature wherein the water chamber is located inside by-pass heating block;
    conditioned upon the water in by-pass heating block reaching a predetermined temperature, allowing a thermal actuator to expand thereby forcing a check valve ball away from the water chamber such that pressurized unheated water from an inlet is forced into the water chamber and the pressurized water entering water chamber forces the heated water to exit through an outlet;
    counting the expulsion or pulse by a pulse counter;
    allowing the thermal actuator to cool and retract such that the check valve ball reseats against water chamber closing off the water flow from the inlet;
    3. conditioned upon the system determining if cold water by-pass solenoid should be activated, activating cold water by-pass solenoid
        conditioned upon the system determining the brewing cycle has not completed, repeating steps 1,2, and 3 above.

11. The method of claim 10, wherein the pulsed heated water from main heating block flows through a basket water line to a spray head and onto flavor containing material that is to be brewed.

12. The method of claim 10, wherein the pulsed heated water from by-pass heating block flows through cold by-pass water line and into a brewing chamber but away from the flavor containing material in brewing chamber.

13. The method of claim 10, wherein control panel determines the number of pulses from the main heating block and from the by-pass heating block required for the selected brew cycle and when the main heating block and the by-pass heating block should be activated during the brew cycle.

* * * * *